United States Patent
Ding et al.

(10) Patent No.: US 7,567,332 B2
(45) Date of Patent: Jul. 28, 2009

(54) MANUFACTURING METHOD OF A DISPLAY PANEL

(75) Inventors: Jau-Min Ding, Taipei (TW); Yan-Rung Lin, Ping-Don County (TW); Ru-De Chen, Taichung County (TW); Chung-Hao Chen, Hsinchu County (TW); I-Chun Chen, Taipei County (TW); Chun-Yuan Lin, Yunlin County (TW); Wei-Hsin Hou, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 362 days.

(21) Appl. No.: 11/553,466

(22) Filed: Oct. 26, 2006

(65) Prior Publication Data

US 2008/0036960 A1   Feb. 14, 2008

(30) Foreign Application Priority Data

Aug. 11, 2006   (TW) ............................... 95129502 A (51) Int. Cl.
*G02F 1/1339* (2006.01)

(52) U.S. Cl. .................. 349/156; 349/153; 349/154; 349/92; 349/93; 349/94; 349/190

(58) Field of Classification Search ............... None
See application file for complete search history.

(56) References Cited

U.S. PATENT DOCUMENTS

| | | | |
|---|---|---|---|
| 6,784,953 B2 | 8/2004 | Liang et al. | |
| 6,795,138 B2 | 9/2004 | Liang et al. | |
| 2001/0033357 A1* | 10/2001 | Niwa et al. | 349/154 |
| 2002/0033926 A1* | 3/2002 | Nakahara et al. | 349/154 |
| 2003/0007238 A1* | 1/2003 | Liang et al. | 359/296 |
| 2004/0219306 A1 | 11/2004 | Wang et al. | |

* cited by examiner

*Primary Examiner*—Uyen Chau N Le
*Assistant Examiner*—Chad H Smith
(74) *Attorney, Agent, or Firm*—Jianq Chyun IP Office (57) ABSTRACT

A method of manufacturing a display panel and a display panel are described. A first substrate is provided. A wall structure is formed on the first substrate to define several microcups. A displaying medium is filled into the microcups. Thereafter, a sealing material is formed over the microcups filled with the displaying medium. A second substrate is put over the sealing material and a lamination process is performed, wherein the sealing material which contacts the wall structure bonds the second substrate to the wall structure, and the sealing material which contacts the displaying medium dissolves in the displaying medium.

18 Claims, 7 Drawing Sheets

FIG. 3D

MANUFACTURING METHOD OF A DISPLAY PANEL

CROSS-REFERENCE TO RELATED APPLICATION

This application claims the priority benefit of Taiwan application serial no. 95129502, filed Aug. 11, 2006. All disclosure of the Taiwan application is incorporated herein by reference.

BACKGROUND OF THE INVENTION

1. Field of the Invention

The present invention relates to a display panel and a manufacturing method thereof, and more particularly, to a micro-cup liquid crystal display panel and a manufacturing method thereof.

2. Description of Related Art

Currently, the flat display has been developed to enlarge its size, and meanwhile, the flat display panel which is lighter, thinner, and more flexible becomes the main objective of future displays, and a micro-cup liquid crystal display can achieve flexibility. A conventional manufacturing method of the micro-cup liquid crystal display first forms a wall structure on a substrate to define a plurality of microcups, and then fills liquid crystal materials into the microcups to form liquid crystal unit cells. Thereafter, a sealing layer and an adhesive layer are formed on the top of each microcup in sequence; finally, another substrate is formed on the adhesive layer to bond the two substrates.

Using liquid crystals as displaying a medium, the liquid crystals serve to develop various display modes, which can be roughly divided into two kinds. One display mode does not need an alignment process performed on the surface and the other in which an alignment process is required. A polymer dispersed liquid crystal display mode is an example of the former, while a twist nematic mode (TN mode) and a vertical alignment mode (VA mode) are examples of the latter. However, the former mode is mostly developed for the micro-cup liquid crystal display, and the alignment process is merely performed on the surfaces of microcup bottoms. Few examples take up the need to develop new display modes in which an alignment process is required. It is because the sealing layer formed on the top of microcups can barely align liquid crystal materials.

US Patent Publication No. US2004/0219306A1 discloses a sealing layer material mainly applicable in an electrophoretic display to solve the issue of the driving characteristic of the electrophoretic display. However, in the method, the high-k photopolymerization polymer is used as the material of the sealing layer.

On the other hand, US Patent No. U.S. Pat. No. 6,784,953B2 and U.S. Pat. No. 6,795,138B2 both provide a micro-cup liquid crystal display, necessarily comprising a microcup, liquid crystals filled into the microcup, and a polymer thin film layer which is coated on the surfaces of the liquid crystals and has a lower density than the liquid crystals. The thin film and the microcup enclose the liquid crystals. However, since the polymer thin film is disposed between the surfaces of liquid crystals and the upper substrate of the liquid crystal display, the liquid crystals cannot directly contact the surface of the upper substrate, so that the alignment layer disposed on the surface of the upper substrate cannot align the liquid crystal molecules.

SUMMARY OF THE INVENTION

One of the present invention is to provide a liquid crystal display panel and a manufacturing method thereof so as to solve the long-standing problem occurring in the conventional manufacturing process of the micro-cup liquid crystal display panel that the liquid crystals on the top of each micro-cup cannot be aligned.

To accomplish the aforementioned, the present invention provides a method of manufacturing a display panel. First, a first substrate is provided. Next, a wall structure is formed on the first substrate to define a plurality of microcups. Next, a displaying medium is filled into the microcups; then a sealing material is formed over the microcups filled with the displaying medium. Thereafter, a second substrate is disposed over the sealing material and a lamination process is performed, wherein the sealing material which contacts the wall structure bonds the second substrate to the wall structure, and the sealing material meeting the displaying medium dissolves therein.

The present invention further provides a display panel which includes a first substrate, a wall structure positioned on the first substrate to define a plurality of microcups, a displaying medium filled into the microcups, a second substrate disposed over the microcups, a sealing material disposed between the wall structure and the second substrate to bond them together, wherein the second substrate directly contacts with the displaying medium.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

FIGS. 1A-1D show cross-sectional schemes of a manufacturing process of a display panel according to one preferred embodiment of the present invention. Firstly, referring to FIG. 1A, a first substrate 100 is provided. In one embodiment, the substrate 100 is a flexible substrate, for example, a polymer plastic substrate. In the present invention, the substrate 100 is not limited to be a flexible substrate, and it may also be a common rigid substrate, for example, a glass substrate. In another embodiment, an electrode layer or a device layer 102 has been formed on the substrate 100. If the display panel provided in the present invention is a passive display panel, the film layer 102 is an electrode layer. On the other hand, if the display panel is an active display panel, the film layer 102 is a device layer mainly comprising switching devices and pixel electrodes. The materials of the electrode layer and the pixel electrodes are, for example, indium tin oxide (ITO), indium zinc oxide (IZO) or other inorganic electrode materials; poly(3,4-ethylene dioxythiophene/poly(styrene sulfonate) (PEDOT/PSS) or other organic conductive materials.

Figure 1A:
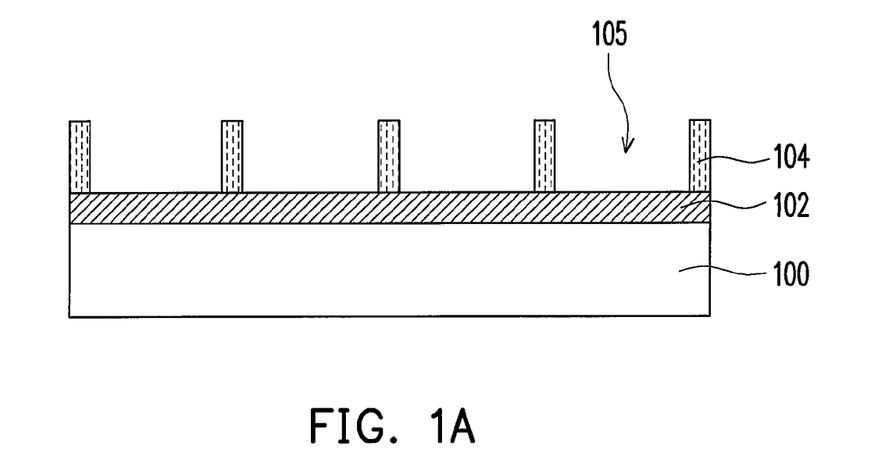
FIGS. 1A-1D show cross-sectional schemes of a manufacturing process of a display panel according to one preferred embodiment of the present invention.

Next, a wall structure 104 is formed on the substrate 100 to define a plurality of microcups 105. If the provided substrate 100 comprises the electrode layer or the device layer 102, the method of forming the wall structure 104 is, for example, a photolithographic process. That is, a photo-sensitive layer (not shown) is formed on the electrode layer or the device layer 102, firstly, and the material is, for example, a photo-sensitive polymer. Then, a photolithographic process is performed to pattern the photo-sensitive layer and forms the wall structure 104. The wall structure can likewise be formed through a molding process.

Figure 1B:
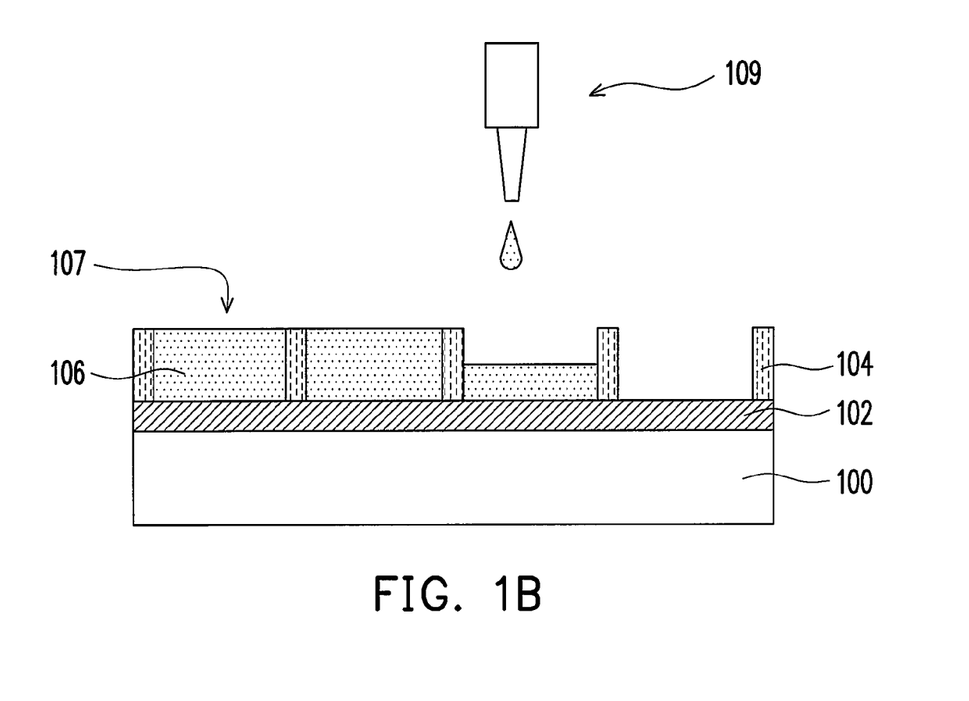

Next, referring to FIG. 1B, a displaying medium 106 is filled into the microcups 105 to form a plurality of display unit cells 107 filled with the displaying medium 106. In one embodiment, the displaying medium 106 is, for example, liquid crystal molecules, such as guest-host liquid crystals, twist nematic liquid crystals, or cholesteric liquid crystals. In one embodiment, the displaying medium 106 is, for example, guest-host liquid crystals added with dye. In another embodiment, the displaying medium 106 is, for example, the twist nematic liquid crystals added with chiral dopants. Additionally, the method of filling the displaying medium 106 into the microcups 105 is, for example, an ink jet printing method 109 or a coating method.

Figure 1C:
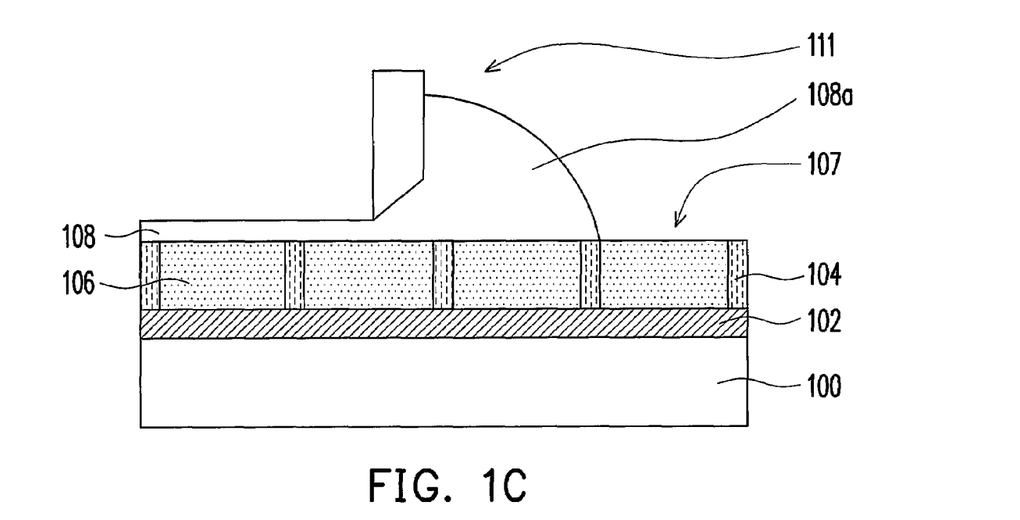

After that, referring to FIG. 1C, a sealing material 108 is formed on the microcups 105, i.e. the display unit cells 107 which are filled with the displaying medium 106. The method of forming the sealing material 108 over the display unit cells 107 includes: preparing a sealing material solution 108a; coating the sealing material solution 108a over the display unit cells 107 through a precise coating technology, such as silt coating, printing, ink jet printing, or blade coating. The sealing material solution 108a comprises a volatile solvent and a material dissolving therein, wherein the material can be selected from polyester, polyamide, polyurethane, and combinations thereof. The volatile solvent of the sealing material solution 108a rapidly volatilizes after the coating process is performed, and then the sealing material 108 is remained on the display unit cells 107. A baking process can certainly be incorporated into the present invention after finishing the coating process of the sealing material solution 108a, so that the volatile solvent of the sealing material solution 108a can volatilize more rapidly. FIG. 1C shows that the display unit cells 107 are coated with the sealing material 108 through the blade coating process 111. But the present invention is not limited to this coating method alone.

Figure 1D:
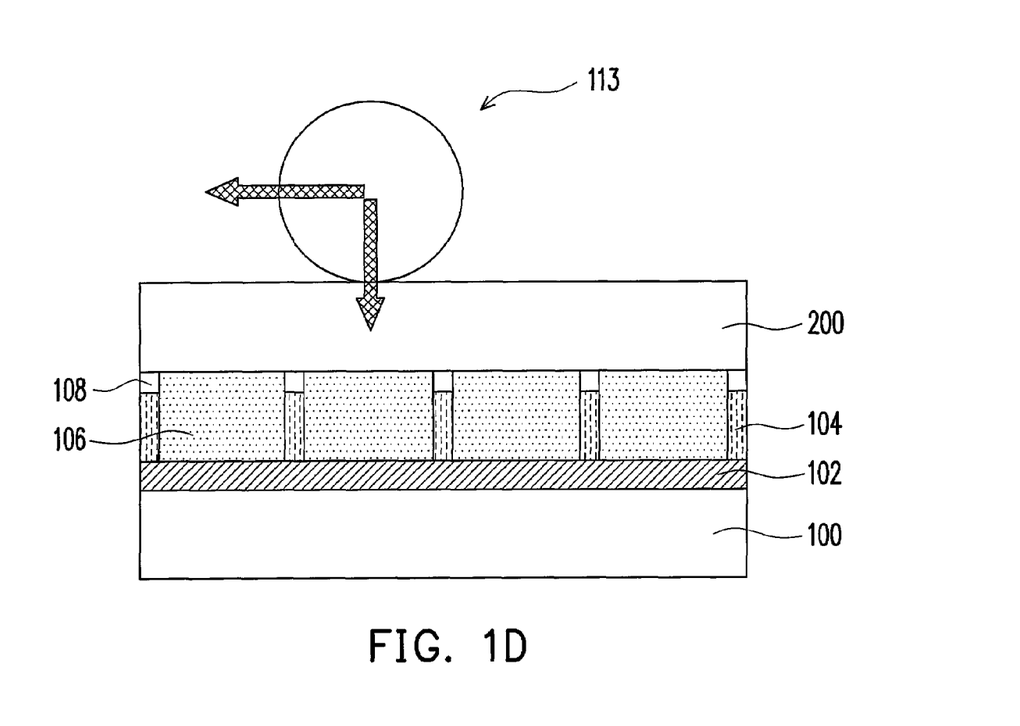

Next, referring to FIG. 1D, a second substrate 200 is disposed over the sealing material 108 and a lamination process is then performed to assemble the first substrate 100 and the second substrate 200. Specifically, the lamination process is, for example, a roller pressing process as shown in FIG. 1D. In one embodiment, the lamination process is a thermal compressing process. The employment of the thermal compressing process depends on the characteristics of the sealing material. The temperature of the thermal compressing process is higher than the activation temperature of the sealing material 108, wherein the activation temperature is, for example, the melting point of the sealing material 108. Accordingly, the sealing material 108 is adhesive under the temperature generated by the thermal compressing process, and since the sealing material 108 contacts with the wall structure 104, it bonds the second substrate 200 to the wall structure 104. In addition, under the temperature generated by the thermal compressing process, the sealing material 108 that contacts the displaying medium 106 dissolves in the displaying medium 106. Hence, the displaying medium 106 connect the second substrate 200. Thus, the present invention can perform an alignment treatment to the second substrate and the displaying medium 106 on the top of each microcup can be aligned.

Note that in one embodiment of the present invention, the solubility of the sealing material 108 reduces as the temperature decreases to a certain level (for example, at room temperate) after the lamination process is performed, especially after the thermal compressing process is performed. The sealing material 108 is then being precipitated through the thermal induced phase separation reaction. The structures of the precipitates separated from the displaying medium 106 vary with the proportion in which the sealing material 108 dissolves into the displaying medium 106 during the thermal compressing process and result in different alignments, which can be employed in different display modes. As expounded above, this embodiment solves the problem in the conventional manufacturing method of the micro-cup liquid crystal display panel that the displaying medium on the top of each microcup cannot be directly aligned. The detailed description is provided hereinafter.

Figure 2A:
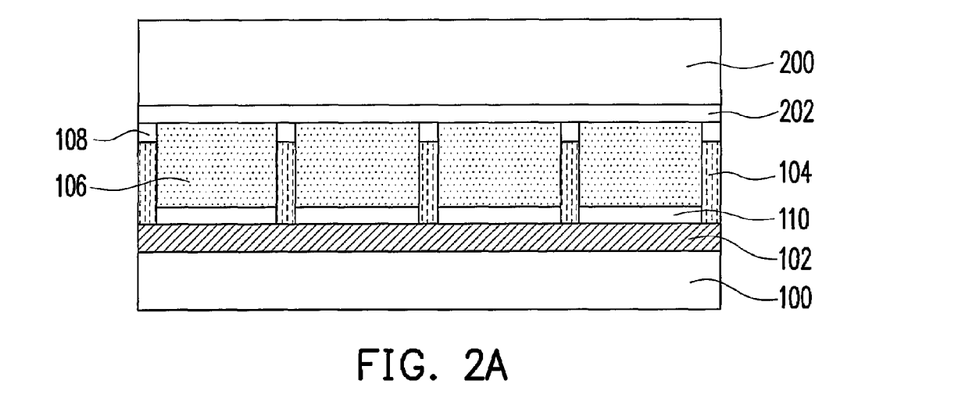
FIGS. 2A through 2F are cross-sectional schemes of a display panel according to other embodiments of the present invention.

FIG. 2A is a cross-sectional scheme of a display panel according to another embodiment of the present invention. Please refer to FIG. 2A. In one preferred embodiment of the present invention, an alignment layer 110 can be further formed on the first substrate 100 before the wall structure 104 is formed and another alignment layer 202 can be further formed on the second substrate 200. When the sealing material 108 that contacts with the displaying medium 106 dissolves into the displaying medium 106, the displaying medium 106 can directly connect with the alignment layer 202 over the second substrate 200, and the alignment layer 202 is then able to align the displaying medium 106 on the top of each microcup 105. According to the above, this embodiment solves the problem in the conventional manufacturing method of the micro-cup liquid crystal display panel that the displaying medium on the top of each microcup cannot be directly aligned.

According to other embodiments of the present invention, after the wall structure 104 is formed, an alignment treatment or plasma surface modification is further performed on the surface of the wall structure 104. In addition, the alignment treatment or plasma surface modification can as well be simultaneously performed on the alignment layer 110 and the surface of the wall structure 104.

Figure 2B:
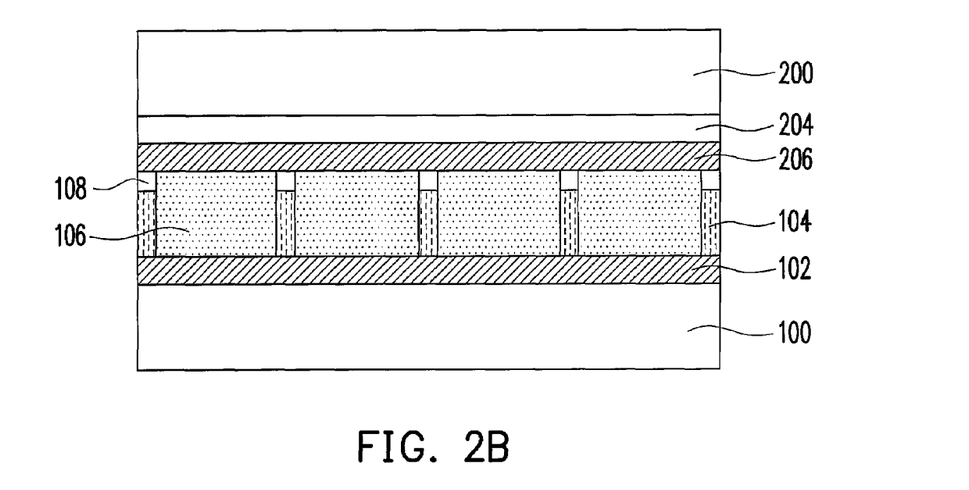

In other embodiments of the present invention, the display panel further includes other film layers. Take the display panel shown in FIG. 2B as an example. Before the second substrate 200 and the first substrate 100 are assembled together, a color filter layer 204 is formed on the second substrate 200, and an electrode layer 206 is formed on the color filter layer 204. The material of the electrode layer is, for example, ITO, IZO or other inorganic electrode materials; poly(3,4-ethylene dioxythiophene/poly(styrene sulfonate) or other organic conductive materials. Therefore, the display panel shown in FIG. 2B is a full color display panel.

Figure 2C:
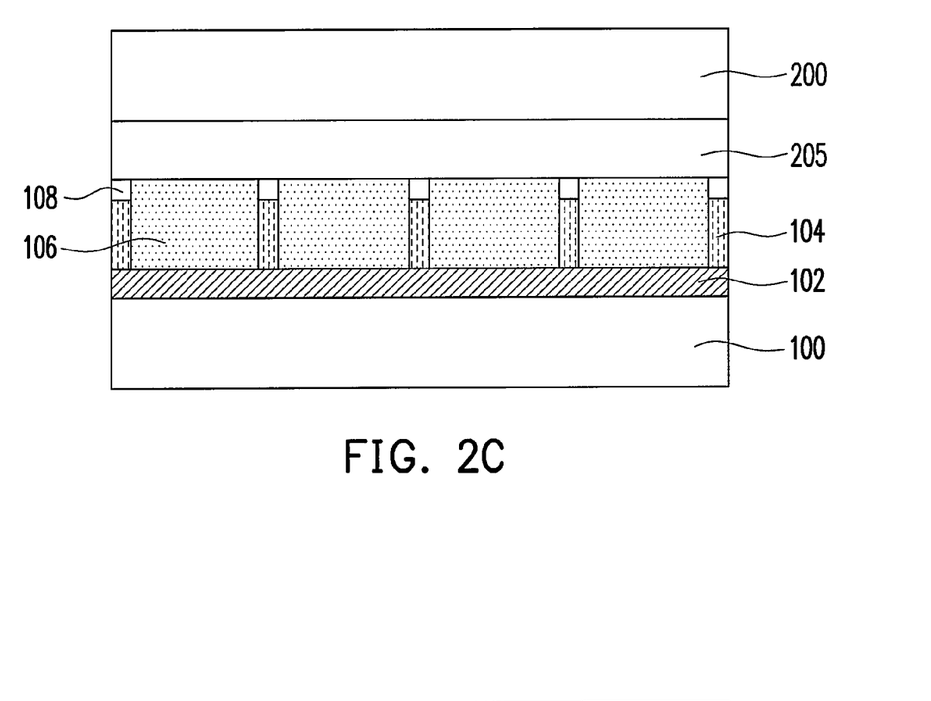

In addition, the color filter layer and the device layer can also be formed over the same substrate. As shown in FIG. 2C, a color filter on array (COA) layer 205 is formed over the second substrate 200. Specifically, the COA layer 205 is stacked with an active device matrix, a color filter layer, and a pixel electrode layer.

Figure 2D:
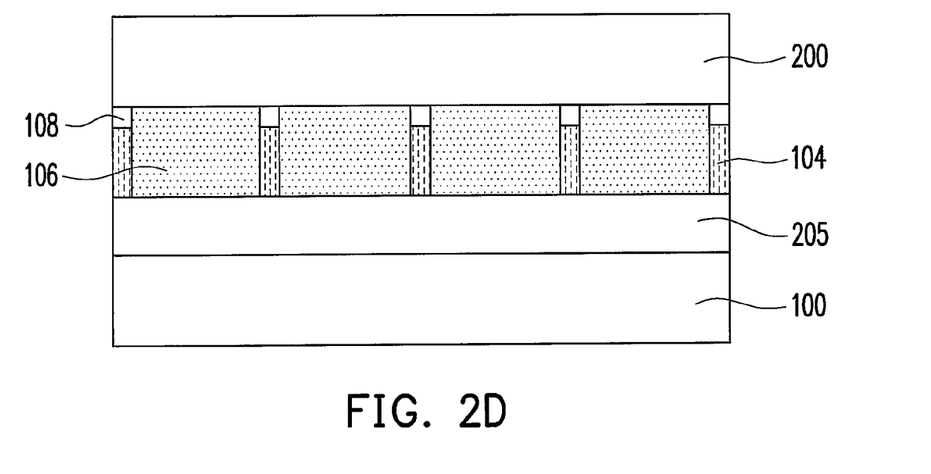

Furthermore, the COA layer 205 can as well be formed over the first substrate 100. As shown in FIG. 2D, the COA layer 205 is formed over the first substrate 100, and the wall structure 104 is then formed over the COA layer 205. Note that as shown in FIG. 2D an alignment layer (positioned as the alignment layer 110 indicated in FIG. 2A) can as well be formed over the COA layer 205.

Figure 2E:
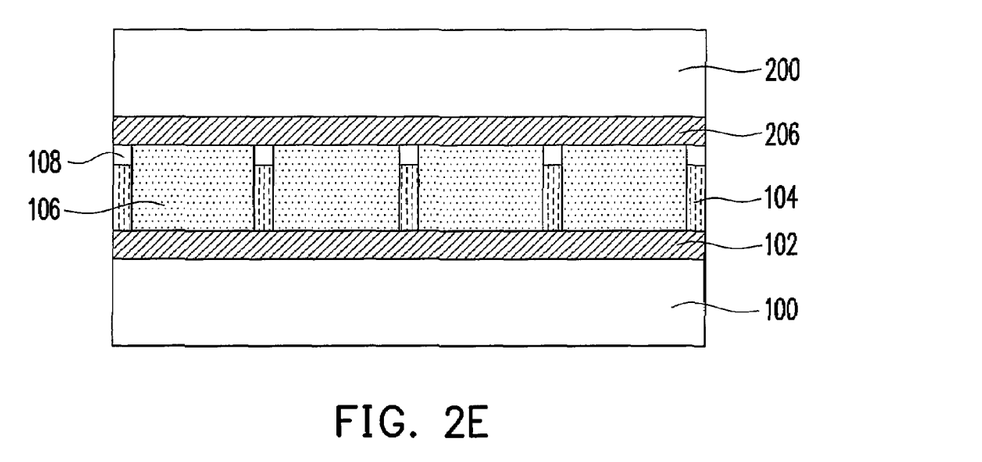

In the present invention, the color filter layer is not necessary in the display panel; for example, the display panel shown in FIG. 2A does not have the color filter layer. Additionally, in the display panel shown in FIG. 2E, an electrode layer or a device layer 206 is formed on the second substrate 200, while the color filter layer is not formed. Note that as shown in FIG. 2E an alignment layer (positioned as the alignment layer 110 indicated in FIG. 2A) can as well be formed over the device layer 102.

Figure 2F:
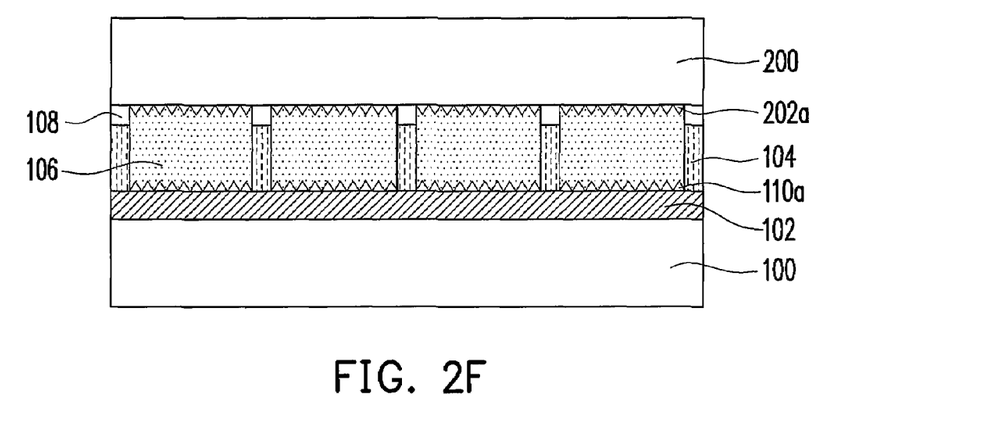

According to another embodiment of the present invention, the alignment layers 110 and 202 shown in FIG. 2A can as well be replaced by a micro structure with an alignment function. Please refer to FIG. 2F, a micro structure 110a is formed on the device layer 102 over the first substrate 100, and a micro structure 202a is likewise formed on the surface of the second substrate 200. Both the micro structures 110a and 202a have an alignment function, and they accordingly can align the liquid crystal molecules 106. The method of manufacturing the micro structures 110a and 202a is, for example, a photolithography process or a molding process. Given that other film layers have been formed on the substrate, the micro structures are preferably formed through the photolithography process. On the other hand, if the provided substrate is a blank substrate, the micro structure can be manufactured with the substrate through the molding process. Note that the micro structures are not limited to be formed over both substrates in the present invention. The invention can also achieve an alignment effect when a micro structure is formed on one of the substrates and an alignment layer is formed on the other substrate.

The display panel in the present invention mainly comprises the first substrate, the second substrate, the microcups formed on the first substrate, and the displaying medium. The electrode layer, the device layer, the color filter layer, the alignment layer, and other film layers can all be appropriately positioned according to the requirements of an actual display panel design.

As for the thermal compressing process described above, different proportions of the sealing material that dissolves into the displaying medium 106 will lead to different structures of the precipitates separated from the displaying medium after the thermal compressing process is performed. Further, different effects may be achieved according to the different structures of the precipitates, so that they can be applied to different display modes, which will be described in detail below.

Referring to FIGS. 3A, 3B, 3C, and 3D, the cross-sectional schemes of a single microcup are provided, respectively. Specifically, the first substrate 100 and the second substrate 200 of the display panel have been assembled together through the lamination process, and the sealing material 108 is then being precipitated from the displaying medium 106. The precipitates 300a, 300b, 300c, and 300d in the displaying medium 106 have different structures.

Figure 3A:
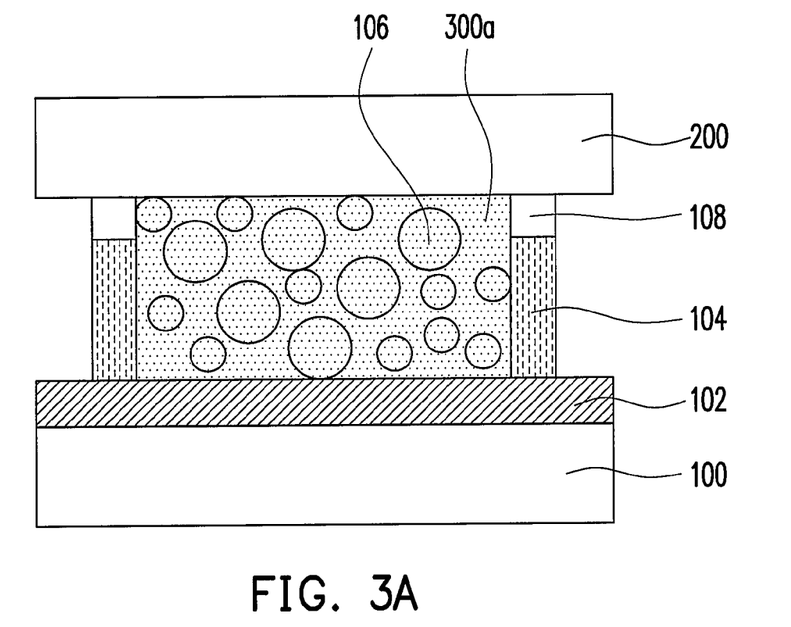
FIGS. 3A through 3D are schemes showing the precipitates and the displaying medium formed in a single microcup, respectively

In the embodiment of FIG. 3A, while the lamination process is performed, the weight ratio of the sealing material dissolving into the displaying medium 106 and the liquid mixture of the displaying medium is between 20%~70%. The concentration of the sealing material in the sealing material solution can be calculated through the volume of the sealing material solution coated on the microcups and the volume of the displaying medium 106 filled into the microcups. After the thermal compressing process is performed, the sealing material dissolving into the displaying medium 106 undergoes the thermal induced phase separation reaction. At this time, the precipitate 300a forms a continuous phase and the displaying medium 106 forms suspension liquid droplets scattering in the continuous phase. Such structure is also referred to as a polymer dispersed liquid crystal (PDLC). The PDLC structure is conductive to applications in displays which generate black-white contrast through the scattering of light.

Figure 3B:
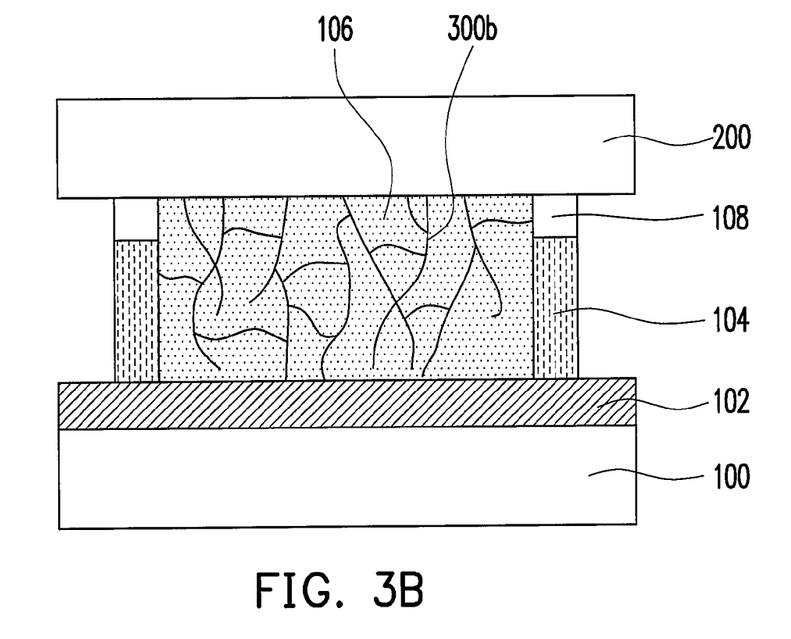

In the embodiment of FIG. 3B, during the lamination process, the weight ratio of the sealing material dissolving into the displaying medium 106 and the liquid mixture of the displaying medium is between 10%~20%. The concentration of the sealing material in the sealing material solution can be calculated through the volume of the sealing material solution coated on the microcups and the volume of the displaying medium 106 filled into the microcups. After the thermal compressing process is performed, the sealing material dissolving into the displaying medium 106 undergoes the reaction of thermal induced phase separation as the temperate decreases. The precipitate 300b with a mesh structure of entangling molecule chains scatters within the displaying medium 106. Such structure is also referred to as a polymer network liquid crystal (PNLC). The PNLC structure is conductive to applications in displays in which the displaying medium is vertically aligned.

Figure 3C:
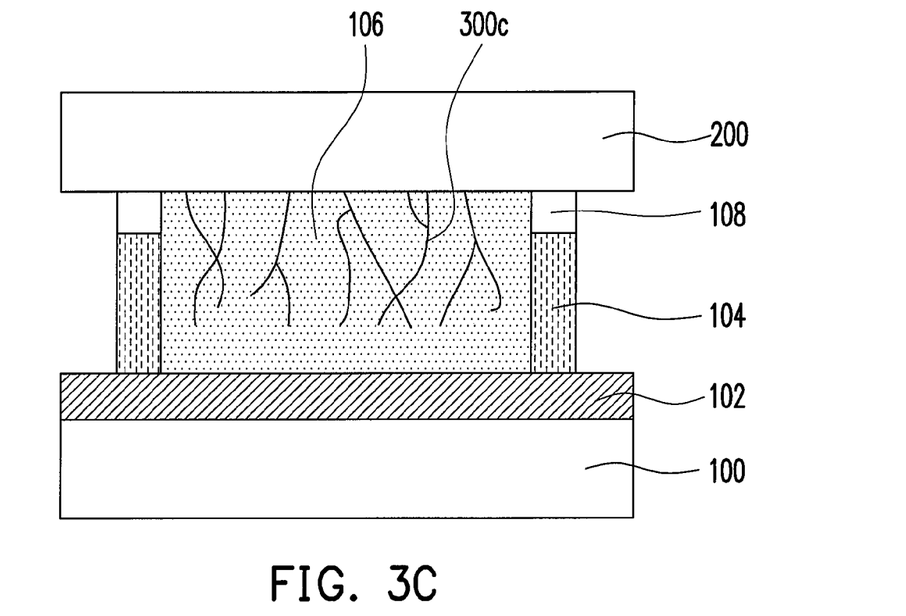

In the embodiment of FIG. 3C, while the lamination process is performed, the dissolution proportion of the sealing material in the displaying medium 106 ranges from 1% to 10%. The concentration of the sealing material in the sealing material solution can be calculated through the volume of the sealing material solution coated on the top of the microcups and the volume of the displaying medium 106 that fills into the microcups. The sealing material that dissolves into the displaying medium 106 undergoes the reaction of thermal induced phase separation after the terminal compressing process is finished. However, the precipitate 300c is insufficient to form a mesh structure, yet the precipitate 300c may still affect the way the displaying medium 106 is arranged. Such structure is also referred to as a polymer stabilized liquid crystal (PSLC).

Figure 3D:
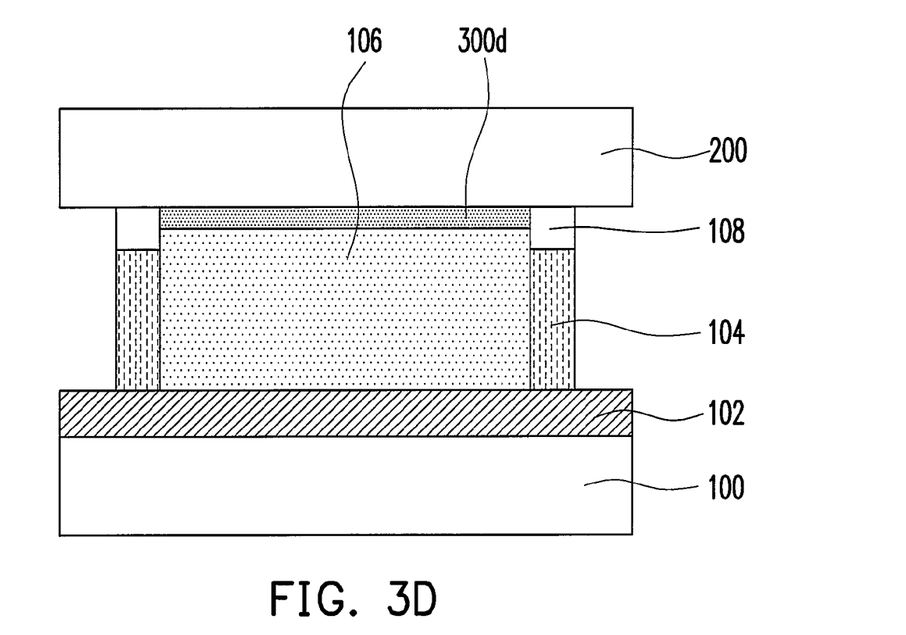

In the embodiment of FIG. 3D, during the lamination process, the dissolution proportion of the sealing material in the displaying medium 106 ranges from 1% to 70%. The concentration of the sealing material in the sealing material solution can be calculated through the volume of the sealing material solution coated on the top of the microcups and the volume of the displaying medium 106 that fills into the microcups. Herein, since the mass transfer rate of the sealing material in the displaying medium 106 is greater than the rate of phase-separation, the sealing material dissolving into the displaying medium 106 undergoes the reaction of thermal induced phase separation during the thermal compressing process, wherein the precipitate 300d is mostly separated from the displaying medium 106. Therefore, the separated precipitate 300d forms a simpler film. Such structure is also referred to as a phase separated composite structure (PSCOS). The PSCOS structure is conductive to applications in displays in which the display medium is horizontally aligned.

In light of the foregoing, adjusting the concentration of the sealing material in the sealing material solution can generate different effects on the displaying medium that fills in the microcups, and the effects can then be applied to different display modes. Several examples are listed below to illustrate the application of each display mode.

Vertically Aligned Liquid Crystal Display Panel

Negative nematic liquid crystals can be filled on the first substrate comprising the electrode layer, the vertically aligned alignment layer, and the microcups. The top of each microcup is then coated with the sealing material solution. The sealing material solution can be diluted with S8743 polyurethane adhesive (manufactured by Huntsman Corporation) at the weight percentage of 15% in the solvent of MEK (methyl ethylketone): EA (ethyl acetate) (1:1). After a baking process is performed for 3 minutes at 60° C., an 80° C. thermal compressing process is then conducted to bond the second substrate having the vertical alignment layer and the electrode layer on its surface. Moreover, polarizers are further disposed on the first and the second substrates to form a vertically aligned liquid crystal display panel.

Horizontally Aligned Liquid Crystal Display Panel

Positive nematic liquid crystals can be filled on the first substrate comprising the electrode layer, the horizontally aligned alignment layer, and the microcups. The top of each microcup is then coated with the sealing material solution. The sealing material solution can be diluted with S8743 polyurethane adhesive (manufactured by Huntsman Corporation) at the weight percentage of 15% in the solvent of MEK: EA (1:1). After a baking process is performed for 3 minutes at 60° C., an 80° C. thermal compressing process is then conducted to bond the second substrate having the horizontal alignment layer and the electrode layer its surface. Moreover, polarizers are further disposed on the first and the second substrates to form a horizontally aligned liquid crystal display panel.

Twist Nematic Liquid Crystal Display Panel

Twist nematic liquid crystals formed by the positive nematic liquid crystals and an adequate amount of chiral dopants can be filled in the microcups where a horizontally aligned surface treatment has been appropriately performed. The top of each microcup is then coated with the sealing material solution. The sealing material solution can be diluted with S7730 polyurethane adhesive (manufactured by Huntsman Corporation) at the weight percentage of 15% in the solvent of MEK: toluene (8:2). After a baking process is performed for 3 minutes at 60° C., an 85° C. thermal compressing process is then conducted to bond the second substrate with the horizontal alignment layer and the electrode layer on its surface. Moreover, polarizers are further disposed on the first and the second substrates to form a horizontally aligned liquid crystal display panel. As the concentration of the chiral dopants alters and the angle between the horizontal alignment layer on the first and second substrates differs, various twist nematic liquid crystal display panel with different twist angles can then be manufactured.

To sum up, the present invention has at least the following advantages and features:

1. Since the sealing material employed in the present invention is dissoluble into the displaying medium, the alignment layer can be formed over the second substrate. After the sealing material dissolves into the displaying medium, the alignment layer can directly connect and align the displaying medium. Accordingly, the present invention solves the longstanding problem in the conventional method of manufacturing the micro-cup liquid crystal display panel that the displaying medium on the top of each microcup cannot be directly aligned.

2. Since the sealing material employed in the present invention is dissoluble in the displaying medium, the sealing material dissolving in the displaying medium is then being precipitated through the thermal induced phase separation reaction, and the precipitates would affect the arrangement of the molecules in the displaying medium.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of manufacturing a display panel, comprising the steps of:
   providing a first substrate;
   forming a wall structure on the first substrate to define a plurality of microcups;
   filling a displaying medium into the microcups;
   forming a sealing material over the microcups filled with the displaying medium; and
   disposing a second substrate over the sealing material and performing a lamination process, wherein the sealing material that contacts the wall structure bonds the second substrate to the wall structure, and the sealing material that contacts the displaying medium then dissolves in the displaying medium.

2. The method according to claim 1, wherein the steps of forming the sealing material over the microcups filled with the displaying medium comprise:
   preparing a sealing material solution; and
   coating the sealing material solution over the microcups filled with the displaying medium.

3. The method according to claim 2, wherein the sealing material solution comprises a volatile solvent and a material dissolving in the volatile solvent.

4. The method according to claim 2, wherein the method of coating the sealing material solution over the microcups filled with the displaying medium comprises a precise coating technology.

5. The method according to claim 1, further comprising forming an electrode layer over the first substrate before the wall structure is formed.

6. The method according to claim 1, further comprising forming a device layer over the first substrate before the wall structure is formed.

7. The method according to claim 1, further comprising forming an alignment layer over the first substrate.

8. The method according to claim 1, further comprising forming a color filter layer over the first substrate.

9. The method according to claim 1, further comprising forming a micro structure with an alignment function over the first substrate.

10. The method according to claim 1, wherein the material of the wall structure is photo-sensitive polymer.

11. The method according to claim 1, wherein the method of manufacturing the wall structure over the first substrate comprises a photolithographic process or a molding process.

12. The method according to claim 1, further comprising performing an alignment treatment or plasma surface modification on the first substrate and the surface of the wall structure after the wall structure is formed on the first substrate.

13. The method according to claim 1, wherein the displaying medium comprises liquid crystals or a mixture mainly composed of liquid crystals.

14. The method according to claim 1, further comprising forming an electrode layer over the second substrate.

15. The method according to claim 1, further comprising forming a device layer over the second substrate.

16. The method according to claim 1, further comprising forming a color filter layer over the second substrate.

17. The method according to claim 1, further comprising forming an alignment layer over the second substrate.

18. The method according to claim 1, further comprising forming a micro structure having an alignment function over the second substrate.

* * * * *